United States Patent
Formby et al.

(10) Patent No.: US 9,686,169 B2
(45) Date of Patent: Jun. 20, 2017

(54) REAL-TIME HIGHLY ACCURATE NETWORK LATENCY MEASUREMENT WITH LOW GENERATED TRAFFIC OR DATA REQUIREMENTS

(71) Applicant: Ixia, Calabasas, CA (US)

(72) Inventors: Kevin Formby, Atlanta, GA (US); Gil Kaufman, Moultonborough, NH (US)

(73) Assignee: IXIA, Calabasas, CA (US)

( * ) Notice: Subject to any disclaimer, the term of this patent is extended or adjusted under 35 U.S.C. 154(b) by 560 days.

(21) Appl. No.: 13/933,661

(22) Filed: Jul. 2, 2013

(65) Prior Publication Data
US 2014/0006610 A1    Jan. 2, 2014

Related U.S. Application Data

(60) Provisional application No. 61/667,324, filed on Jul. 2, 2012.

(51) Int. Cl.
*G06F 15/173* (2006.01)
*H04L 12/26* (2006.01)

(52) U.S. Cl.
CPC ...... *H04L 43/0852* (2013.01); *H04L 43/0858* (2013.01); *H04L 43/106* (2013.01); *H04L 43/12* (2013.01)

(58) Field of Classification Search
CPC ............. H04L 43/0852; H04L 43/0858; H04L 43/106; H04L 43/12
See application file for complete search history.

(56) References Cited

U.S. PATENT DOCUMENTS

| | | | |
|---|---|---|---|
| 6,868,069 B2 | 3/2005 | Knobbe et al. | |
| 7,092,586 B2 | 8/2006 | Vokey et al. | |
| 7,881,209 B2 | 2/2011 | Beliles, Jr. et al. | |
| 8,718,482 B1 * | 5/2014 | Roberts | H04B 10/27 398/102 |
| 8,767,565 B2 | 7/2014 | Dalmau et al. | |
| 9,130,945 B2 | 9/2015 | Smith et al. | |

(Continued)

FOREIGN PATENT DOCUMENTS

| | | | | |
|---|---|---|---|---|
| SE | WO 2011144263 A1 * | 11/2011 | | H04J 3/0673 |
| WO | WO 2016/168063 A1 | 10/2016 | | |
| WO | WO 2016/168064 A1 | 10/2016 | | |

OTHER PUBLICATIONS

Notification of Transmittal of the International Search Report and the Written Opinion of the International Searching Authority, or the Declaration for International Application No. PCT/US2016/040523 (Sep. 12, 2016).

(Continued)

*Primary Examiner* — Ryan Jakovac
(74) *Attorney, Agent, or Firm* — Jenkins, Wilson, Taylor & Hunt, P.A.

(57) ABSTRACT

Systems and methods for accurately calculating the latency of a data-network, by providing an electronic device that receives data packets moving across a network data point and compares their time of arrival with a timestamp stored within a data packet. The electronic device may calculate the average latency by comparing N number of data packets. Further systems and methods for comparing the latencies at N number of electronic devices placed at unique network data points and calculating latencies between each device.

10 Claims, 1 Drawing Sheet

(56) References Cited

U.S. PATENT DOCUMENTS

| | | | |
|---|---|---|---|
| 9,380,070 | B1 | 6/2016 | Cain et al. |
| 2003/0105976 | A1 | 6/2003 | Copeland, III |
| 2004/0190547 | A1 | 9/2004 | Gordy et al. |
| 2007/0268938 | A1* | 11/2007 | Dowd .................. H04J 3/0673 370/509 |
| 2009/0231191 | A1 | 9/2009 | Wu et al. |
| 2011/0170534 | A1 | 7/2011 | York |
| 2011/0199133 | A1 | 8/2011 | Yamada |
| 2011/0211473 | A1 | 9/2011 | Matityahu et al. |
| 2012/0166327 | A1* | 6/2012 | Amicangioli ...... G06Q 10/0635 705/37 |
| 2012/0275317 | A1* | 11/2012 | Geva .................. H04J 3/0667 370/250 |
| 2013/0080817 | A1* | 3/2013 | Mihelic ................ H04J 3/0667 713/401 |
| 2013/0094515 | A1 | 4/2013 | Gura et al. |
| 2013/0173778 | A1 | 7/2013 | Hsy et al. |
| 2013/0212439 | A1 | 8/2013 | Stevens et al. |
| 2013/0259049 | A1 | 10/2013 | Mizrahi |
| 2013/0265886 | A1* | 10/2013 | Leong ................... H04L 43/10 370/250 |
| 2013/0278312 | A1 | 10/2013 | Getzin et al. |
| 2013/0329595 | A1 | 12/2013 | Scholz |
| 2013/0343207 | A1 | 12/2013 | Cook et al. |
| 2013/0347103 | A1* | 12/2013 | Veteikis ................ H04L 43/04 726/22 |
| 2014/0185632 | A1 | 7/2014 | Steiner et al. |
| 2014/0297852 | A1 | 10/2014 | Shimizu et al. |
| 2014/0317288 | A1 | 10/2014 | Krueger et al. |
| 2014/0321285 | A1 | 10/2014 | Chew et al. |
| 2014/0344930 | A1 | 11/2014 | Foley |
| 2015/0016274 | A1 | 1/2015 | Holland |
| 2015/0023168 | A1 | 1/2015 | Kotecha et al. |
| 2015/0023170 | A1 | 1/2015 | Kakadia et al. |
| 2015/0281025 | A1 | 10/2015 | Wallbaum et al. |
| 2016/0065434 | A1 | 3/2016 | Janakiraman |
| 2016/0110211 | A1 | 4/2016 | Karnes |
| 2016/0285575 | A1 | 9/2016 | Holmeide |
| 2016/0301589 | A1 | 10/2016 | Rata et al. |
| 2016/0301599 | A1 | 10/2016 | Porfiri et al. |
| 2016/0306726 | A1 | 10/2016 | Regev |
| 2016/0309434 | A1 | 10/2016 | Regev |
| 2016/0315756 | A1 | 10/2016 | Tenea et al. |

OTHER PUBLICATIONS

Notification of Transmittal of the International Search Report and the Written Opinion of the International Searching Authority, or the Declaration for International Application No. PCT/US2016/026534 (Jul. 8, 2016).

Notification of Transmittal of the International Search report and the Written Opinion of the International Searching Authority, or the Declaration for International Application No. PCT/US2016/026533 (Jul. 8, 2016).

Commonly-assigned, co-pending U.S. Appl. No. 14/860,630 for "Methods, Systems, and Computer Readable Media for Detecting Physical Link Intrusions," (Unpublished, filed Sep. 21, 2015).

Commonly-assigned, co-pending U.S. Appl. No. 14/819,337 for "Modelling a Clock," (Unpublished, filed Aug. 5, 2015).

"Network Time Protocol," Wikipedia, https://en.wikipedia.org/wiki/Network_Time_Protocol, pp. 1-7 (Jul. 3, 2015).

Commonly-assigned, co-pending U.S. Appl. No. 14/688,630 for "Methods, Systems, and Computer Readable Media for Synchronizing Timing Among Network Interface Cards (NICs) in a Network Equipment Test Device," (Unpublished, filed Apr. 16, 2015).

Commonly-assigned, co-pending U.S. Appl. No. 14/688,552 for "Methods, Systems, and Computer Readable Media for Emulating Network Devices with Different Clocks," (Unpublished, filed Apr. 16, 2015).

Commonly-assigned, co-pending U.S. Appl. No. 14/685,552 for "Methods, Systems, and Computer Readable Media for One-Way Link Delay Measurement," (Unpublished, filed Apr. 13, 2015).

"High Density Modular Fiber Tap," Ixia, http://www.ixiacom.com/products/net-optics-flex-tap, pp. 1-4 (Jul. 2014).

"Ixia Anue 3500—Mobile Backhaul Testing Solution," Ixia Data Sheet, pp. 1-5 (Dec. 2013).

Arnold, "What Are All of These IEEE 1588 Clock Types," http://blog.meinbergglobal.com/2013/10/21/ieee1588clocktypes/, News and Tutorials from Meinberg, pp. 1-6 (Oct. 21, 2013).

"AN-1838 IEEE 1588 Boundary Clock and Transparent Clock Implementation Using the DP83640," Application Report, Texas Instruments, pp. 1-9 (Apr. 2013).

Spirent, "Precision Time Protocol (PTP) IEEE 1588," YouTube "alantalkstech", https://www.youtube.com/watch?v=yw-gd01aOYg, pp. 1-11 (Dec. 7, 2011).

Eidson, "IEEE-1588 Standard for a Precision Clock Synchronization Protocol for Networked Measurement and Control Systems—A Tutorial," Agilent Technologies, pp. 1-94 (Oct. 2005).

Non-Final Office Action for U.S. Appl. No. 14/860,630 (Dec. 19, 2016).

Non-Final Office Action for U.S. Appl. No. 14/685,552 (Oct. 20, 2016).

Non-Final Office Action for U.S. Appl. No. 14/688,630 (Oct. 17, 2016).

Notification of Transmittal of the International Search Report and the Written Opinion of the International Searching Authority, or the Declaration for International Application No. PCT/US2016/040532 (Sep. 12, 2016).

Commonly-assigned, co-pending International Application No. PCT/US16/40532 for "Methods, Systems, and Computer Readable Media for Detecting Physical Link Intrusions," (Unpublished, filed Jun. 30, 2016).

* cited by examiner

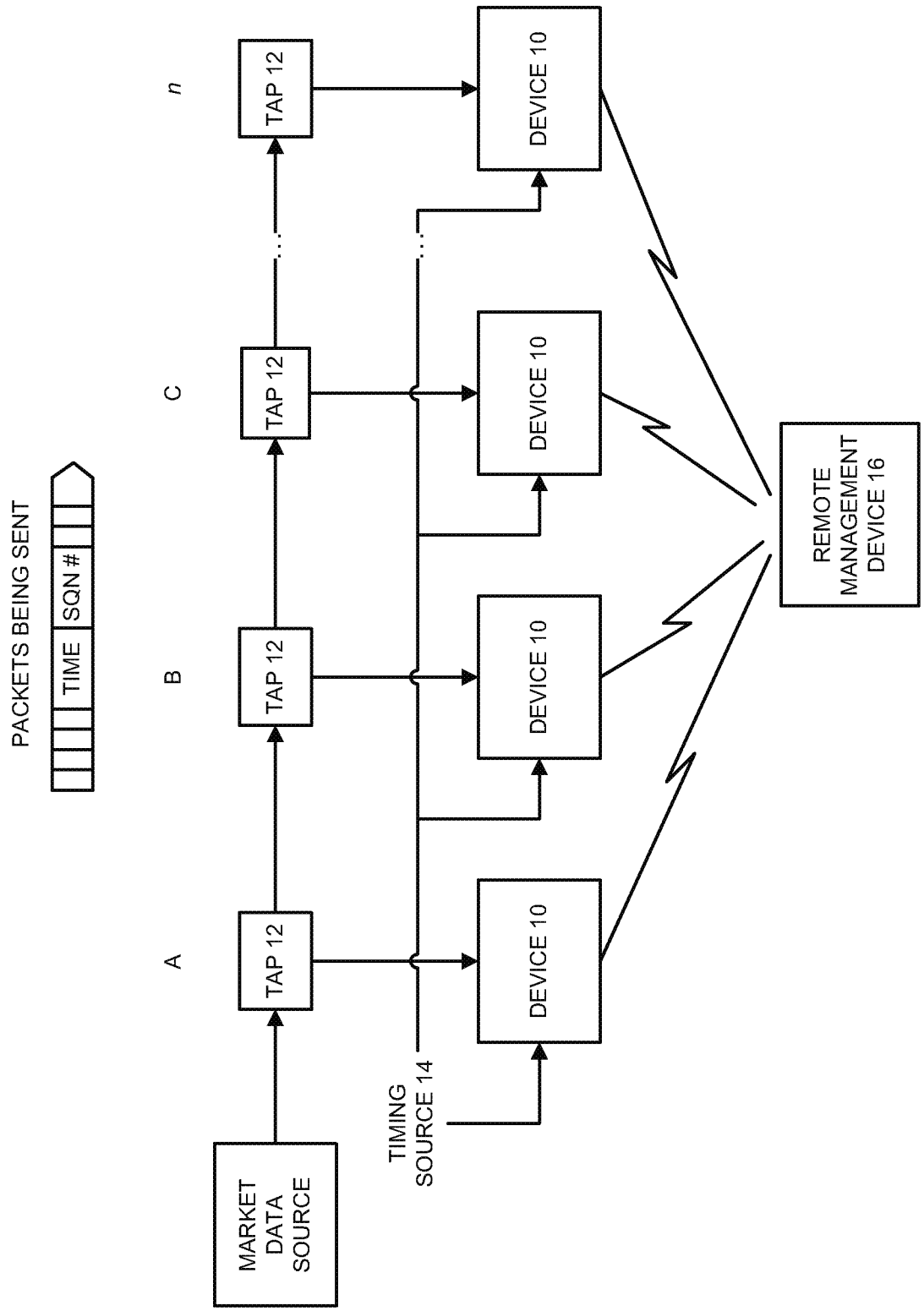

REAL-TIME HIGHLY ACCURATE NETWORK LATENCY MEASUREMENT WITH LOW GENERATED TRAFFIC OR DATA REQUIREMENTS

CROSS REFERENCES TO RELATED APPLICATION

This application claims priority to U.S. Provisional Patent Application Ser. No. 61/667,324, filed on Jul. 2, 2012 and entitled "Real-time Highly Accurate Network Latency Measurement with Low Generated Traffic or Data Requirements" the entire disclosure of which is incorporated by reference.

BACKGROUND OF THE INVENTION

1. Field of Invention

The present invention generally relates to systems that measure or predict latency within data networks.

2. Description of the Related Art

Many different applications require communications networks with low or predictable latency. In particular, High Frequency Trading requires minimized network latency to ensure quick trading between exchanges or other execution venues. Current methods to minimize or predict network latency are complex, error prone, or are unsuitable for larger networks. It is therefore necessary to measure or predict the network latency that the market data incurs as it flows across multiple networks on a "hop" by "hop" basis in a simple, accurate, and large-scale way.

One such current method is to inject a packet at the receiving location and 'ping' the various routers or network devices that traffic is flowing over. Measuring the time taken for a ping to be returned to the device originating the 'ping' allows computation of the round trip latency. However, while this technique is useful for measuring round trip latency, it is unsuitable for measuring one-way latency. This is because, in many environments, and particularly in those involving market data traffic, the traffic volumes are significantly asymmetrical—the traffic on the sending path is significantly greater than the traffic on the return path. Thus the one-way traffic measurements estimated from round-trip measurements do not represent the latency of actual one-way traffic flow. In addition, the 'test' measurement packet used to generate the 'ping' will often produce more errors, either because it causes extra traffic or its size or priority is not the same as real traffic. Accordingly, there is a need for an accurate way to measure data networks' one-way latency.

Another method is to passively 'tap' the traffic flows along the data path by using devices called 'probes' and append a time stamp to the captured data using an accurate synchronized clock source derived from a GPS signal or an Atomic clock and using timing protocols such as NTP and PPS, or IEEE 1588 (Precision Time Protocol—also known as PTP) or IRIG-B. If the captured packet has some form of unique identifier it is possible to send the captured data to a central source or to another capture device where data from two separate taps can be analyzed and compared to derive one way latencies between the two points. The key disadvantage of this approach is that it generates large amounts of network traffic as details of each packet (its unique identifier and time stamp) are sent between probes or to a central device. The approach may be feasible for measuring latencies between specific points in a given location—e.g. data center—but is less feasible when large amounts of data have to be sent over wide area networks. Accordingly, there is a need for a way to measure latency over large-scale networks.

Another method is to insert a timestamp into the packet of the originating data stream and measure when that arrives at a given point. The latency can be measured by using either a passive 'tap' or if the latency from the originating to the destination point is required this can be calculated by extracting the time stamp in the destination hardware associated with the end application. As long as the same time stamp is being used at the origination and receiving locations it is possible to compute the end to the end latency by comparing the time of arrival of the packet with the timestamp embedded within it. The disadvantage of this approach is that it relies on the injection of time stamps into the data flow that would otherwise not be there. This increases the bandwidth used on the link and adds complexity at the transmitting location. Accordingly, there is a need to simply measure network latency without consuming large amounts of bandwidth.

SUMMARY OF THE INVENTION

The present invention is directed to a system and method that satisfies this need to measure or predict the one way network latency in a simple, accurate, and large-scale way.

Other objects and advantages of the present invention will in part be obvious, and in part appear hereinafter.

In accordance with the foregoing objects and advantages, an electronic device synced to a time source (such as a GPS timing signal or an atomic clock) and configured to receive a plurality of data packets from a network data point, wherein each of the data packets contains data representing a predetermined time.

Wherein the electronic device is further configured to ascertain, according to the time source, a time when a first data packet from the plurality of data packets arrived at the electronic device and to calculate a first difference between the first data packet's arrival time with the first data packet's predetermined time According to an aspect, the time source is derived from an atomic clock via a network protocol such as PTP or NTP/PPS or IRIG-B.

According to an aspect, the time source is derived from a GPS timing signal via a network protocol such as PTP or NTP/PPS or IRIG-B.

According to an aspect, the electronic device is based on a field programmable gate array.

According to an aspect, the electronic device is based on an application-specific integrated circuit.

According to an aspect, a network tap programmed to monitor the network data point and to send the plurality of data packets from the network data point to the electronic device.

According to an aspect, the device is further configured to ascertain, according to the time source, a time when a second data packet from the plurality of data packets arrived at the electronic device and to calculate a second difference between the second data packet's arrival time to the second data packet's predetermined time and to average the first difference and the second difference, resulting in a first average latency.

According to an aspect, wherein the device is further configured to calculate a standard deviation of time difference.

According to an aspect, a remote management system capable of querying the device and receiving from the device the first average latency or the standard deviation.

According to an aspect, a second electronic device synced to the time source and configured to receive the plurality of data packets from a second network data point, wherein the electronic device is further configured to ascertain, according to the time source, a time when the first data packet from the plurality of data packets arrived at the second electronic device and to calculate a third difference between the first data packet's arrival time at the second electronic device with the first data packet's predetermined time, to ascertain, according to the time source, a time when the second data packet from the plurality of data packets arrived at the second electronic device, to calculate a fourth difference between the second data packet's arrival time at the second electronic device to the second data packet's predetermined time, and to average the third difference with the fourth difference resulting in a second average latency wherein the remote management system is further capable of querying the second electronic device and receiving the average latency from the second device, and to calculate the difference between the first average latency and the second average latency.

According to an aspect, a method for measuring network latency, comprising: receiving a plurality of data packets from a network data point at an electronic device, wherein each of the data packets contains data representing a predetermined time; ascertaining with the electronic device and according to a time source, a time when a first data packet from the plurality of data packets arrived at the electronic device; calculating with the electronic device, a first difference between the first data packet's arrival time with the first data packet's predetermined time.

According to an aspect, ascertaining with the electronic device and according to the time source, a time when a second data packet from the plurality of data packets arrived at the electronic device;
calculating with the electronic device a second difference between the second data packet's arrival time to the second data packet's predetermined time;
averaging with the electronic device the first difference and the second difference, resulting in a first average latency.

According to an aspect, receiving the plurality of data packets from a second network data point at a second electronic device,
ascertain with the second electronic device and according to the time source, a time when the first data packet from the plurality of data packets arrived at the second electronic device and calculating with the second electronic device, a third difference between the first data packet's arrival time at the second electronic device with the first data packet's predetermined time, ascertaining with the second electronic device, according to the time source, a time when the second data packet from the plurality of data packets arrived at the second electronic device, calculating a fourth difference between the second data packet's arrival time at the second electronic device to the second data packet's predetermined time, and to average the third difference with the fourth difference resulting in a second average latency wherein the remote management system is further capable of querying the second electronic device and receiving the average latency from the second device.

BRIEF DESCRIPTION OF THE DRAWINGS

The present invention will be more fully understood and appreciated by reading the following Detailed Description in conjunction with the accompanying drawing, in which:

FIG. 1 is a block diagram of an embodiment of the system of the present invention.

DETAILED DESCRIPTION

As background, when trades are executed on a financial Exchange or execution venue, or quotes are displayed on the associated 'Order Book,' information on these actual or potential transactions are disseminated via a market data feed. The market data feed contains a stream of market data according to a well defined message format specification. This specification contains many different pieces of information—such as message type trade identifier (Trade ID), number of shares to be sold, price etc. One of the parameters included within a packet is a time stamp at which the trade took place or the order was posted on the order book. The time stamp may be derived from a standard highly accurate source—e.g. GPS or atomic clock or may be on only 'loosely' synced via NTP (Network Timing Protocol). In many cases the market data is distributed using multicast which uses the UDP transport protocol. Because UDP is an unreliable protocol, sequence numbers are added to the messages that allow the feed handler at the final destination of the market—for example a hedge fund or a broker/dealer, to detect gaps in the sequence number and so identify lost market data.

Referring now to the drawings, wherein like reference numerals refer to like parts throughout, there is seen in FIG. 1 a schematic of network latency measuring device according to an embodiment of the present invention. FIG. 1 shows an electronic device 10 that is fed from a network tap 12 that is passively monitoring the flow of market data across any given point in a communications network. Network tap 12 copies the data moving across the network point and sends it to device 10. Device 10 may be implemented by any high-speed circuit, for example, an FPGA. Each device 10 is also provided with a time source 14 synced to a common standard—e.g. PTP or PPS/NTP linked to a GPS timing source or an atomic clock. Device 10 is capable of looking within the network packets it receives from the tap and extracting key data such as sequence numbers, trade ID or time of trade or posting of the quote.

In one embodiment, device 10, using time source 14, measures a packet's time of arrival and compares it to the time of trade or quote being placed on the order book stored within the packet. This allows device 10 to calculate the one-way latency from when the market data event occurred at source of the market data, to the time that message arrived at device 10. By examining N unique messages in this way, it is possible to derive an average and standard deviation of the time difference between the market events and the arrival of the associated packets. If the Exchange or market data source has used the same time reference as device 10 (e.g., atomic clock or GPS) this method will yield a highly accurate latency result. The unique messages are 'keyed' off the sequence number. Unless the variability of the timing source 14 is large, this measurement will be a close approximation to the network latency from the market source to the monitoring point.

The data stored in device 10 can be accessed by a remote management device 16. Because device 10 has already calculated the average or the standard deviation, communicating with remote management device 16 does not require device 10 to pass along high volumes of data such as individual time stamps of data packets. This means that calculating and communicating the average latency or standard deviation can be done without consuming large amounts of bandwidth.

Remote management device 16 can also query, receive, collect and store, latency data from multiple devices 10 placed in one or several networks.

In an alternative embodiment, remote management 16 can calculate the latency between two network points without relying on the market source's clock. In this embodiment, remote management device 16 receives the latency data from two or more devices 10 at different network points and calculates the differences between the two latency times. As long as devices 10 are placed in succession along the network path, and have received the same unique messages, the difference in latency between the two will accurately represent the latency between the two network points. Because the resulting latency information does not rely on the market source's clock, this removes any possible errors incurred by internal variable delays within the market data source, and by variations between the clock of the market data source is using and the clock with which devices 10 are synced. Devices 10 can ensure they are relying on the same unique messages by 'keying' on the serial number contained within the data packets.

By looking at N devices 10 positioned at different network, under either embodiment, remote management device 16 can generate network latency statistics per hop.

What is claimed is:

1. A system for measuring network latency, comprising:
   a first network tap configured to passively copy, from a first network data point, data packets moving across a network;
   a second network tap configured to passively copy, from a second network data point, the data packets moving across the network;
   a first electronic device synced to a time source and configured to receive the data packets copied by the first network tap, wherein each of the data packets copied by the first network tap contains data representing a predetermined time, wherein said first electronic device is further configured to ascertain, according to said time source, a time when a first data packet from the data packets copied by the first network tap arrived at said first electronic device and to calculate a first difference between said first data packet's arrival time and said first data packet's predetermined time, wherein the first data packet comprises a message associated with a transaction in a financial market, the predetermined time represents a time of trade or a posting of a quote in an order book associated with the financial market and the first difference represents a one-way latency between the time of trade or the posting of the quote and the arrival of the first packet at the first electronic device and wherein the first electronic device is further configured to calculate the one-way latency for each of the data packets copied by the first network tap using the predetermined time representing the time of trade or the posting of a quote in the order book associated with the financial market in each of the plurality of data packets, and to compute a mean and a standard deviation of the one-way latency using the one-way latencies of the data packets copied by the first network tap;
   wherein said first electronic device is further configured to ascertain, according to said time source, a time when a second data packet from the data packets copied by the first network tap arrived at said first electronic device, to calculate a second difference between said second data packet's arrival time to said second data packet's predetermined time, and to average said first difference and said second difference, resulting in a first average one-way latency;
   a second electronic device synced to said time source and configured to receive said plurality of data packets copied by the second network tap, wherein said second electronic device is further configured to ascertain, according to said time source, a time when said first data packet from said data packets copied by said second network tap arrived at said second electronic device and to calculate a third difference between said first data packet's arrival time at said second electronic device and said first data packet's predetermined time, to ascertain, according to said time source, a time when said second data packet from said data packets copied by said second network tap arrived at said second electronic device, to calculate a fourth difference between said second data packet's arrival time at said second electronic device to said second data packet's predetermined time, and to average said third difference with said fourth difference resulting in a second average one-way latency; and
   a management device for querying the first electronic device to obtain the first average one-way latency and the mean and the standard deviation of the one-way latency, wherein said management device is further capable of querying said second electronic device and receiving said second average one-way latency from said second electronic device, and to calculate the difference between said first average one-way latency and said second average one-way latency.

2. The system of claim 1, wherein said time source is an atomic clock.

3. The system of claim 1, wherein said time source is a GPS timing signal.

4. The system of claim 1, wherein said time source is the same as the time source used to determine said predetermined time.

5. The system of claim 1, wherein said first and second electronic devices are each based on a field programmable gate array.

6. A method for measuring network latency, comprising:
   using a first network tap, passively copying, from a first network data point, data packets moving across a network;
   using a second network tap, passively copying, from a second network data point, the data packets moving across the network;
   receiving the data packets copied by the first network tap at a first electronic device, wherein each of said data packets copied by the first network tap contains data representing a predetermined time; ascertaining with said first electronic device and according to a time source, a time when a first data packet from said data packets copied by the first network tap arrived at said first electronic device; calculating with said first electronic device, a first difference between said first data packet's arrival time and said first data packet's predetermined time, wherein the first data packet comprises a message associated with a transaction in a financial market, the predetermined time represents a time of trade or a posting of a quote in an order book associated with the financial market and the first difference represents a one-way latency between the time of trade or the posting of the quote and the arrival of the first packet at the first electronic device; calculating, by the first electronic device, the one-way latency for each of the plurality of data packets copied by the first network tap using the predetermined time representing the time of trade or the posting of a quote in the order book associated with the financial market in each of the plurality of data packets copied by the first network tap; and computing, by said first electronic device, a mean and a standard deviation of the one-way latency using the one-way latencies of the plurality of data packets copied by the first network tap;

ascertaining with said first electronic device and according to said time source, a time when a second data packet from said plurality of data packets copied by the first network tap arrived at said first electronic device;

calculating with said first electronic device a second difference between said second data packet's arrival time and said second data packet's predetermined time;

averaging with said first electronic device said first difference and said second difference, resulting in a first average one-way latency;

receiving said plurality of data packets copied by said second network tap at a second electronic device, ascertaining with said second electronic device and according to said time source, a time when said first data packet from said plurality of data packets copied by said second network tap arrived at said second electronic device;

calculating with said second electronic device, a third difference between said first data packet's arrival time at said second electronic device and said first data packet's predetermined time, ascertaining with said second electronic device, according to said time source, a time when said second data packet from said plurality of data packets copied by said second network tap arrived at said second electronic device;

calculating a fourth difference between said second data packet's arrival time at said second electronic device and said second data packet's predetermined time, and averaging said third difference with said fourth difference, resulting in a second average one-way latency;

querying, by a management device, the first electronic device to obtain the first average one-way latency and the mean and the standard deviation of the one-way latency;

querying, by the management device, the second electronic device to obtain the second average one-way latency; and calculating, by the management device, a difference between the first and second average one-way latencies.

7. The method of claim 6, wherein said time source is an atomic clock.

8. The method of claim 6, wherein said time source is a GPS timing signal.

9. The method of claim 6, wherein said time source is the same as the time source used to determine said predetermined time.

10. The method of claim 6, wherein said first and second electronic devices are each based on a field programmable gate array.

* * * * *